(Model.)
W. A. McADAMS.
INSECT CATCHER.
No. 483,079. Patented Sept. 20, 1892.
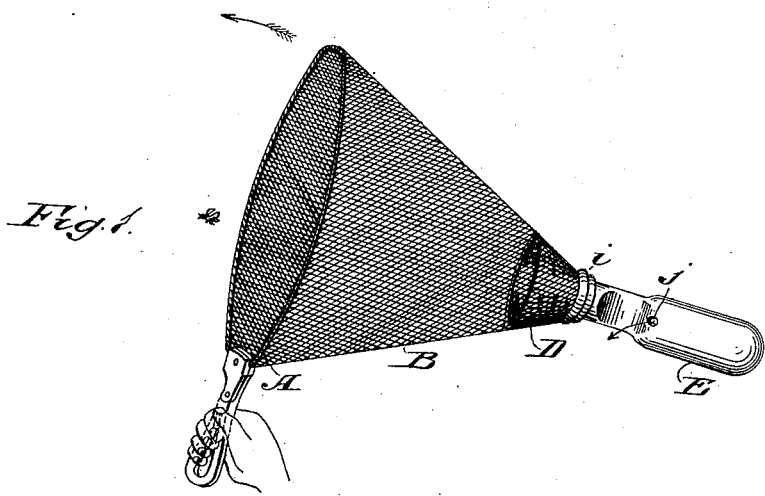
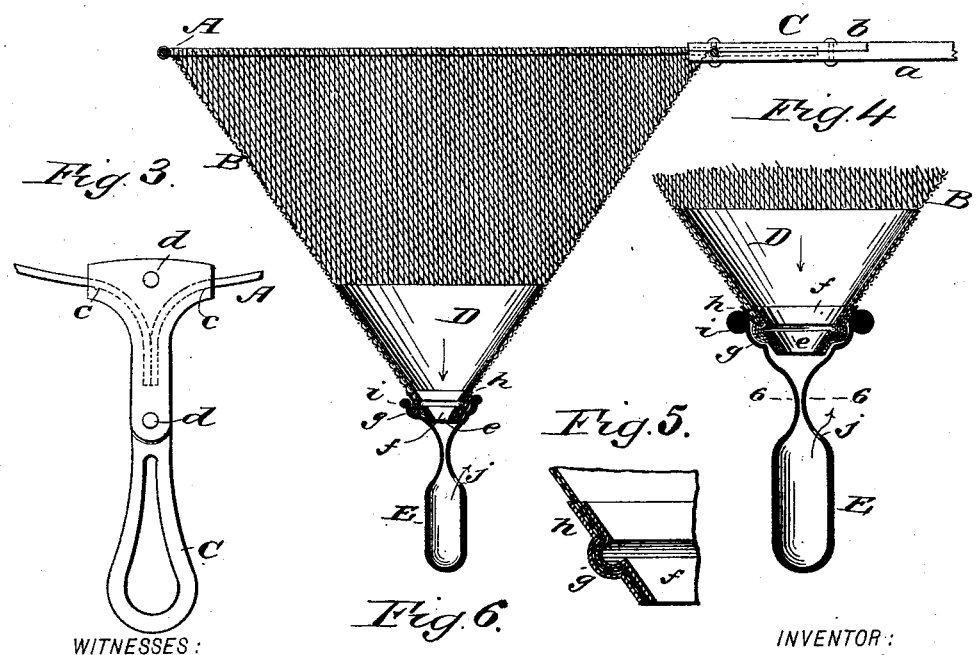
WITNESSES:
F. McArdle
C. Sedgwick
INVENTOR:
W. A. McAdams
BY Munn & Co
ATTORNEYS

UNITED STATES PATENT OFFICE.

WILLIAM ALBERT McADAMS, OF BROOKLYN, NEW YORK.

INSECT-CATCHER.

SPECIFICATION forming part of Letters Patent No. 483,079, dated September 20, 1892.

Application filed December 3, 1891. Serial No. 413,954. (Model.)

*To all whom it may concern:*

Be it known that I, WILLIAM ALBERT MC-ADAMS, of Brooklyn, in the county of Kings and State of New York, have invented a new and Improved Insect-Catcher, of which the following is a specification, reference being had to the annexed drawings, forming a part thereof, in which—

Figure 1 is a perspective view of my improved insect-catcher. Fig. 2 is a side sectional elevation. Fig. 3 is a detail plan view of the handle, showing the attachment of the hoop which supports the net. Fig. 4 is an enlarged sectional side elevation of the receiver and the apex of the conical net. Fig. 5 is an enlarged transverse section of the conical net and ring for receiving the smaller end thereof, and Fig. 6 is a transverse section of the receiver, taken on line 6 6 in Fig. 4.

Similar letters of reference indicate corresponding parts in all the views.

The object of my invention is to construct an insect-catcher, by means of which the insect will be caught and delivered to a receptacle adapted to retain it until it is released or destroyed.

My invention consists in the combination, with a hoop provided with a suitable handle, of a conical net having an opening in the apex thereof and provided with an imperforate covering over the portions adjoining the apex and an elastic bulb or pouch fitted to the apex of the net and furnished with a flattened normally-closed neck and an aperture for the escape of air, all as will be hereinafter more fully described.

The hoop A, forming the support of the net B, is made of a piece of wire bent into circular form with its ends curved outwardly where they adjoin and enter the handle C. The said handle C is made of wood, iron, or other suitable material in two parts $a$ $b$, in each of which are formed curved oppositely-arranged grooves $c$, as shown in Fig. 3, the ends of the wire hoop A being inserted in the grooves. The parts $a$ $b$ of the handle C are fastened together by means of rivets or screws $d$.

The net B is made in conical form of any suitable textile fabric, such as imitation wire-screen net, and the seam of the fabric is preferably formed by sewing the edges together. In the apex of the conical net is formed an aperture $e$, and within the apex of the net is secured an imperforate lining D of cloth or other suitable material, which extends a short distance toward the mouth of the net and serves to gather the air and force it toward the aperture $e$ when the net is moved in the manner presently to be described. Within the apex of the conical net is placed a conical thimble $f$, provided with an outwardly-projecting bead $g$, and upon the outside of the apex of the net is placed a thimble $h$ of corresponding form, between which the material of the net and the lining are clamped. To the outer thimble $h$ is fitted the neck $i$ of the elastic rubber bulb or pouch E, the neck being provided with a thickened rim, which embraces the bead of the outer thimble. The narrower part of the neck of the elastic bulb E is flattened, giving it an oblong cross-section, the parallel sides of this portion of the neck being held normally near each other or in contact.

In the bulb or pouch E, within the flattened portion of the neck, is formed an aperture $j$ for the escape of air gathered by the movement of the net.

The net is used by grasping the handle in the hand and carrying it forward with sufficient rapidity through the air to cause the funnel to expand, following the insect in its flight until it is within the meshes of the net, and continuing the motion, so as to keep up a current of air through the imperforate lining of the apex of the net, thus forcing the insect through the aperture $e$ into and through the neck of the elastic bulb or pouch E, the neck being expanded laterally by the current of air and the force of the confined air within the pouch stretching the neck into approximately circular shape to a sufficient extent to allow the insect to pass into the bulb or pouch. The bulb or pouch returns to its normal position when motion ceases, thereby confining the insect. After the insect is captured the bulb or pouch E may be removed from the apex of the neck, and the insect may be liberated by pressing the neck of the pouch into circular shape and disposed of in any approved manner.

My improved insect-catcher is especially advantageous in ridding the house of flies, mosquitoes, and other flying insects. It may also be used by naturalists in capturing specimens of winged insects.

Having thus described my invention, I claim as new and desire to secure by Letters Patent—

1. An insect-catcher comprising a net having an aperture in the apex thereof and an elastic pouch or bulb covering the apertured apex and communicating with the net, substantially as specified.

2. An insect-catcher consisting of a conical net with a pouch attached to and removable from the apex thereof, both constructed substantially as described, to the end that the insect may be readily removed from the pouch and that the pouch may be easily cleaned or washed when needed.

3. A self expanding and contracting neck in a pouch or bag, in combination with a net or conical-shaped cloth bag, for the purpose described.

4. A conical net having its meshes closed from the point of the net to a short distance from the point, so as to catch and confine the air when the net is in motion for the purpose of expanding the neck in the pouch and forcing a current of air through the neck and out of the orifice in the pouch, to the end that the insects may have room to pass in the neck and be drawn through into the pouch by the current of air.

5. A pouch or receiver of soft rubber, having a compressed or flattened neck and provided with one or more holes for the escape of air beyond the place of compression, thereby causing a draft of air through the neck of said pouch or receptacle for drawing flies and other insects into the said pouch or receptacle, substantially as specified.

6. An insect-catcher comprising a conical net having an aperture in the apex thereof and provided with an imperforate portion at the apex, a rigid support for the apex of the net, and an elastic pouch covering the aperture of the apex of the net and with a hole for the escape of air, substantially as specified.

WILLIAM ALBERT McADAMS.

Witnesses:
   GEO. M. HOPKINS,
   C. SEDGWICK.